United States Patent Office.

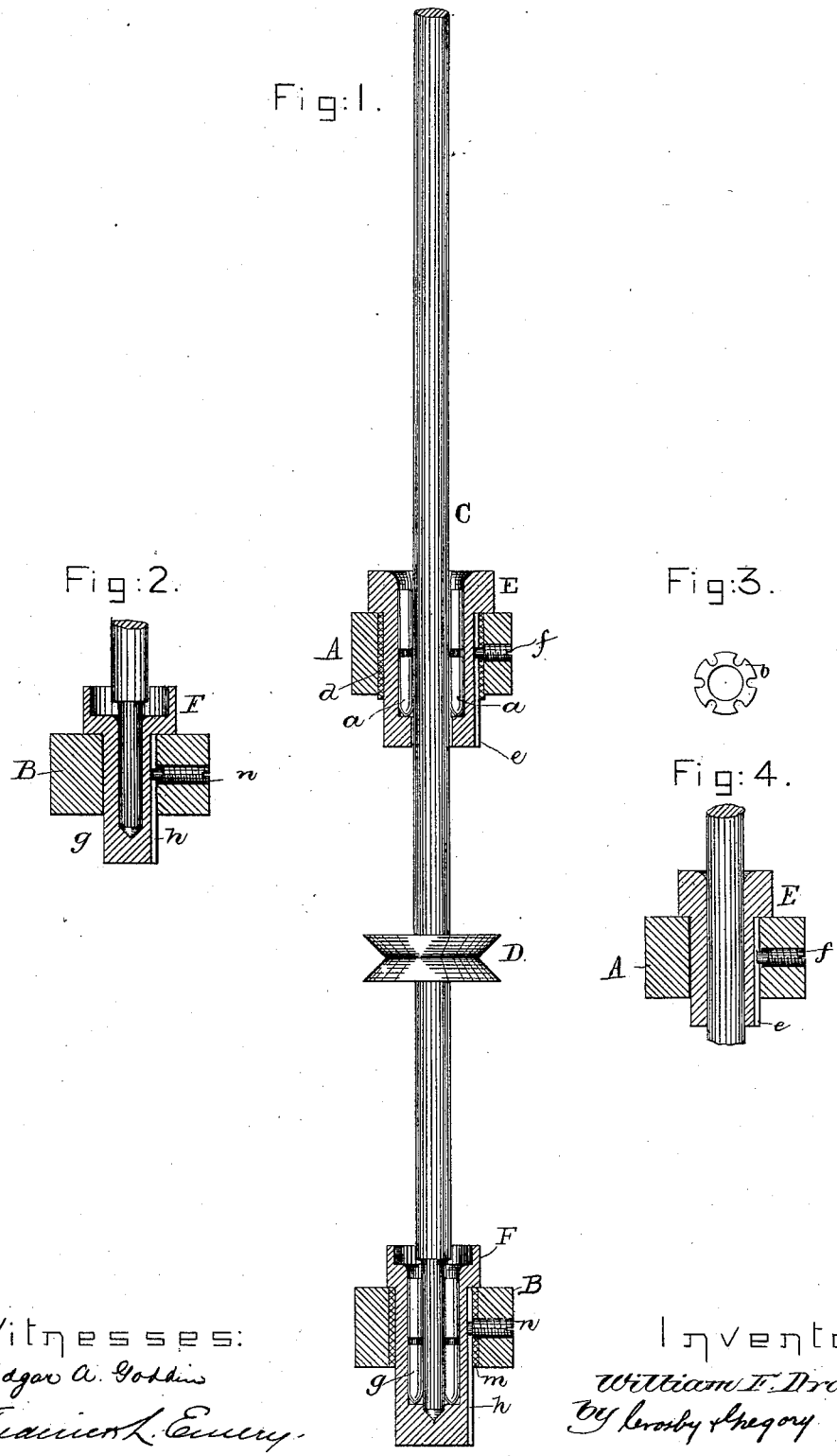

WILLIAM F. DRAPER, OF HOPEDALE, MASSACHUSETTS, ASSIGNOR TO GEORGE DRAPER & SONS, OF SAME PLACE.

BEARING FOR SPINDLES.

SPECIFICATION forming part of Letters Patent No. 428,557, dated May 20, 1890.

Application filed March 9, 1888. Serial No. 266,733. (No model.)

*To all whom it may concern:*

Be it known that I, WILLIAM F. DRAPER, of Hopedale, county of Worcester, and State of Massachusetts, have invented an Improvement in Bearings for Spindles, of which the following description, in connection with the accompanying drawings, is a specification, like letters on the drawings representing like parts.

This invention has for its object to improve the bearings of that class of spinning-frame spindles having independent bearings above and below the whirl.

In my invention the bolster and step bearings, one or both, are provided with rolling surfaces, whereby the said spindles may be run at higher speed than heretofore with but the minimum of friction.

The bolster or step bearings herein described may both be mounted loosely with relation to the rails holding them, so as to obviate jar or chattering due to vibration of the spindle when unequally loaded and run at high speed.

The particular features in which my invention consists will be hereinafter pointed out in the specification, and defined in the claims at the end of the specification.

Figure 1 shows a sufficient portion of a spinning-machine to illustrate my invention, the rails and the bolster and step bearings being in section, while the spindle and whirl thereon are in elevation, the spindle being broken off at its upper end to save space upon the drawings. Fig. 2 is a modification of my invention, it showing a step-bearing from which the rolling surfaces have been omitted. Fig. 3 shows the spider, and Fig. 4 shows a bolster-shell without rolls, it constituting the upper bearing for the spindle.

The bolster-rail A, the step-rail B, and the spindle C, having the whirl D, are and may be all as usual.

The bolster-rail A, as shown in Fig. 1, receives within it loosely a bolster-shell E, containing a series of rolling surfaces, as $a$, free to rotate about a vertical axis, said surfaces being herein shown as held in place in the said bolster-shell by means of a spider, as $b$. (Shown best in Fig. 3.) The bolster-shell will preferably be surrounded by an elastic or yielding packing, as $d$, and to restrain the said shell from rotation I have provided it with a groove, as $e$, into which enters the inner end of a screw, as $f$, the said screw and groove constituting a means for restraining the rotation of the bolster-shell with the spindle. The step-shell F (shown in Fig. 1) is also provided with a series of like rolling surfaces, as $g$, and the shank of the step-shell surrounded by an elastic packing, as $m$, is mounted loosely in a hole in the step-rail, suitable means, as a groove $h$, in the step-shell and the end of a screw $n$ serving to restrain the rotation of the step-shell with the foot of the spindle. If desired, either the bolster-shell or the step-shell may have the rolling surfaces omitted from it, and, if desired, either of the said shells may be secured rigidly in its co-operating rail, as in Figs. 4 and 2, by the screws $f$ or $n$, they being screwed snugly and firmly against the bolster or step.

Mounting the bolster-shell loosely in a bolster-rail permits the said bolster-shell to yield to vibrations of the spindle above its whirl, and so, also, mounting the step-shell loosely in the step-rail permits the step-shell to move laterally, to accommodate the vibrations of the foot of the spindle.

I do not broadly claim a loosely-held bolster-shell or a loosely-held step-shell.

Providing the bolster-shell, or the bolster-shell and the step-shell, with rolling surfaces such as described reduces to the minimum the friction of the running-spindle upon its bearings.

Instead of the fibrous packing, cork or metallic springs or any usual means for enabling the bearing to move against an elastic pressure may be used without departing from my invention and would be within the scope of the term "elastic packing."

English Patent No. 876 of 1882 shows rollers at both ends of a collar used in connection with a flyer-spindle; but prior to this invention I am not aware that a spindle having a whirl has ever had bearings above and below the whirl, which bearings were provided at their interior with rolling surfaces, as herein shown.

I claim—

1. The bolster and step rails and the bolster-shell and the step-shell having rolling surfaces, combined with the spindle, one of the said shells being mounted in one of the said rails loosely, substantially as described.

2. The bolster and step rails and the bolster-shell and the step-shell having rolling surfaces, combined with the spindle, both of the said shells being mounted in both of the said rails loosely, substantially as described.

3. The bolster and step rails and the bolster and step shells, one of which contains rolling surfaces, and one of which shells is mounted loosely in one of the said rails, combined with a spindle, to operate substantially as described.

4. The bolster and step rails and the bolster and step shells therein, combined with the spindle, one of the said shells containing rolling surfaces, both shells being mounted loosely in the said rails, substantially as described.

5. The bolster and step rails and the bolster and step shells, one of which contains rolling surfaces, and one of which shells is mounted loosely in one of the said rails, and one of which shells is also provided with an elastic or yielding packing, combined with a spindle, to operate substantially as described.

6. The bolster and step rails and the bolster and step shells therein, combined with the spindle, one of the said shells containing rolling surfaces, both shells being mounted loosely in the said rails, and one of which shells is also provided with an elastic or yielding packing, substantially as described.

In testimony whereof I have signed my name to this specification in the presence of two subscribing witnesses.

WM. F. DRAPER.

Witnesses:
E. D. BANCROFT,
H. F. SEARLES.